US008484657B2

(12) United States Patent
Drabant et al.

(10) Patent No.: US 8,484,657 B2
(45) Date of Patent: Jul. 9, 2013

(54) NETWORK EXECUTION PATTERN

(75) Inventors: Bernhard Drabant, Muehlhausen (DE); Uwe Bloching, Nussloch (DE)

(73) Assignee: SAP AG, Walldorf (DE)

( * ) Notice: Subject to any disclaimer, the term of this patent is extended or adjusted under 35 U.S.C. 154(b) by 1287 days.

(21) Appl. No.: 12/261,766

(22) Filed: Oct. 30, 2008

(65) Prior Publication Data

US 2010/0115515 A1  May 6, 2010

(51) Int. Cl.
  *G06F 9/44* (2006.01)
(52) U.S. Cl.
  USPC .......................................................... 719/310
(58) Field of Classification Search
  None
  See application file for complete search history.

(56) References Cited

U.S. PATENT DOCUMENTS

| | | | |
|---|---|---|---|
| 2007/0150504 A1* | 6/2007 | Ahmed et al. ................ | 707/102 |
| 2008/0028084 A1 | 1/2008 | Bloching et al. | |
| 2009/0044202 A1 | 2/2009 | Bloching et al. | |
| 2010/0153976 A1 | 6/2010 | Drabant et al. | |

* cited by examiner

*Primary Examiner* — Andrew Caldwell

*Assistant Examiner* — Benjamin Geib

(74) *Attorney, Agent, or Firm* — Brake Hughes Bellermann LLP

(57) ABSTRACT

A plurality of nodes may be arranged within a hierarchy to perform actions, each node may perform a task associated an action. A dependency evaluator may determine, based on a request to perform an action, the first subset of the nodes configured to perform the action, wherein a first node of a higher level of the hierarchy is dependent upon a response from a second node of a lower level of the hierarchy to perform a task associated with the action. A request engine may provide the request to a lowest level of the hierarchy, wherein the second node of the lowest level may perform a task associated with the requested action and respond to the dependent first node. A response engine may receive the response from one of the nodes on a highest level of the hierarchy, including a performance of the tasks and the requested action.

21 Claims, 12 Drawing Sheets

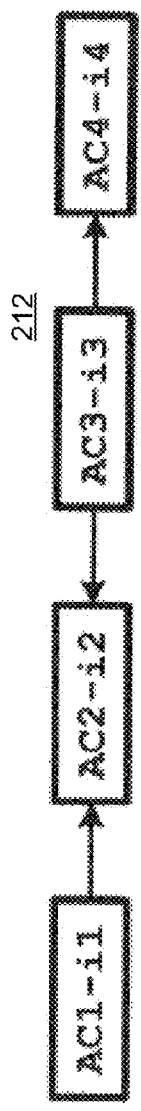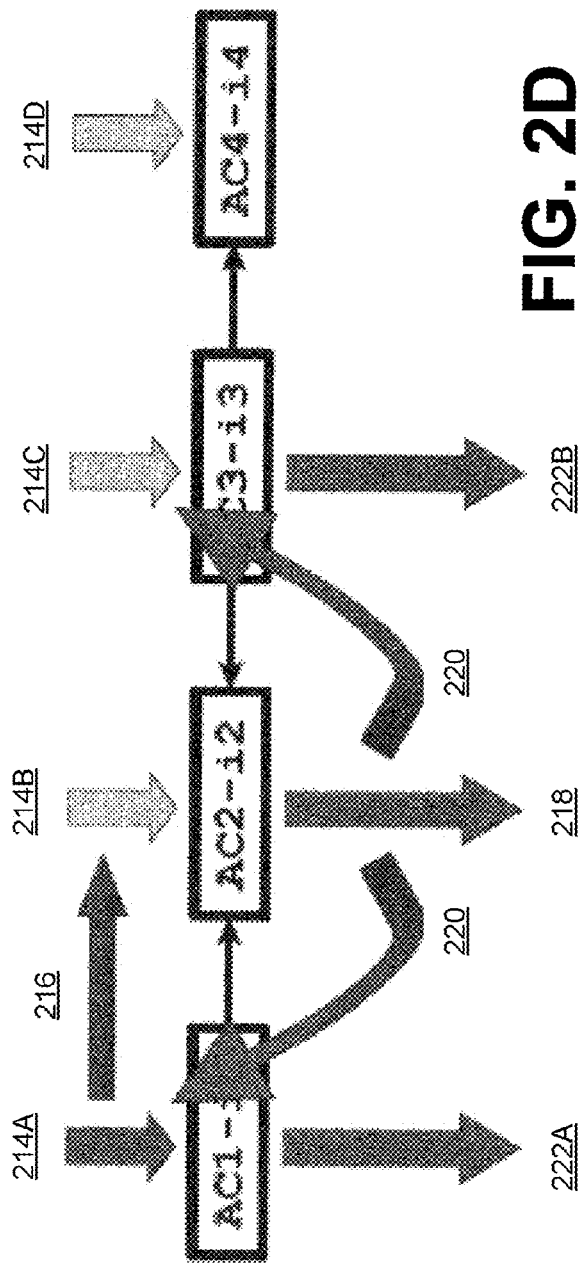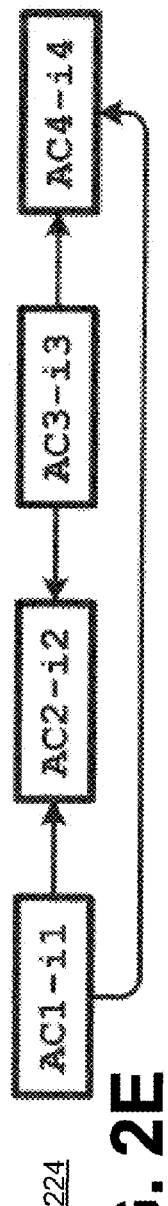

NETWORK EXECUTION PATTERN

TECHNICAL FIELD

This description relates to network execution patterns.

BACKGROUND

Many modern computing systems are developed to perform various complex tasks that require integration or coordination between a number of different components. For example, generating a display or graphical user interface (GUI) may require a number of different components to interact with each other, including, a brightness component, a color component, a hue component, a component to determine which shapes are to appear on the screen and other possible components. Without an effective means of communication among these components, modern computing systems could not operate.

SUMMARY

According to an example embodiment a system is provided. A plurality of application nodes is arranged within a hierarchy to perform one or more actions, wherein each application node within a first subset of the plurality of application nodes is configured to perform a task associated with a first action of the one or more actions. An input handler is configured to receive a request to perform the first action. A dependency evaluator is configured to determine, based on the request, the first subset of the application nodes configured to perform the first action, wherein a first application node of a higher level of the hierarchy is dependent upon a response from a second application node of a lower level of the hierarchy to perform a task associated with the first action. A request engine is configured to provide the request to a lowest level of the hierarchy, wherein the second application node of the lowest level will perform a task associated with the first action and provide a response to the dependent first application node. A response engine is configured to receive the response from one of the application nodes on a highest level of the hierarchy, wherein the response includes a performance of the tasks associated with the first action by the first subset of application nodes.

According to another example embodiment a method is provided. A request to perform an action is received, wherein a plurality of application nodes are each configured to perform a task associated with the action. The application nodes are organized into a multi-level hierarchy of dependency pairings, wherein a performance of a first task by a first application node of a dependency pairing at a higher level of the hierarchy is dependent upon a performance of a second task by a second application node of the dependency pairing at a lower level of the hierarchy. Until a response is received at the first node of a highest level dependency pairing of the hierarchy, the request is provided to the second application node of a lowest level dependency pairing of the hierarchy that has not performed the action, wherein upon completion of the second task associated with the action by the second application node of the lowest level dependency pairing, the response is provided to the first application node of the lowest level dependency pairing. The response, including the performance of the tasks associated with the action by the plurality of application nodes of the hierarchy of dependency pairings, is provided responsive to receiving the request.

According to another example embodiment, a method is provided. At a first application node of a plurality of application nodes, a first request to perform an action is received, wherein the first application node is dependent upon a response from one or more dependent application nodes of the application nodes to perform the action. A maximum dependency path is determined between the first application node and a last application node of the dependent application nodes that share a dependency, wherein the performance of the action by the first application node depends upon a response by the last application node and the last application node does not depend upon a response from another application node to begin performing the action. The dependent application nodes are organized into a hierarchy wherein a lowest level of the hierarchy includes at least the last application node, and wherein one or more higher levels of the hierarchy include one or more other of the application nodes including the first application node at a highest level of the hierarchy. The request is provided to the lowest level of the hierarchy, wherein each of the dependent application nodes on the lowest level perform the action and provide a response to a next higher level of the hierarchy until all of the dependent application nodes of the hierarchy perform the action and provide a response to the first application node. A final response based on a performance of the action by each of the plurality of application nodes and including the response from each of the dependent application nodes that performed the action is received from the first application node. Responsive to the request, the final response is provided.

According to another example embodiment a system is provided. A plurality of application nodes are each configured to perform a task associated with a performance of an action, wherein each application node comprises a component of one or more dependency pairings. The one or more dependency pairings are associated with the application nodes, wherein, to perform a first task, a first application node of a dependency pairing is dependent upon a performance of a second task by a second application node of the dependency pairing. A hierarchy of the dependency pairings, wherein a higher level of the hierarchy includes the first application node of a dependency pairing, and a lower level of the hierarchy includes the second application node a dependency pairing. A controller is configured to receive a request to perform the action and provide a response to the request based on the performance of the tasks associated with the action by the plurality of application nodes in the hierarchy.

According to another example embodiment a method is provided. A plurality of application nodes arranged as dependency pairings to perform an action are determined, wherein each dependency pairing includes a first application node that is dependent upon a response by a second application node of the dependency pairing to perform a task associated with the action. A hierarchy of the dependency pairings including multiple levels, are determined wherein a higher level of the hierarchy includes the first application node of a dependency pairing and a next lower level of the hierarchy includes the second application node of the dependency pairing. A request to perform the action is received. The request is provided to the second application node of a lowest level dependency pairing of the hierarchy. A final response is received from the first application node of a highest level dependency pairing of the hierarchy, the final response including a performance of the tasks associated with the action by the application nodes. The final response is provided responsive to receiving the request.

According to another example embodiment a system is provided. A graph includes multiple application nodes that are arranged and configured to receive requests and produce responses, wherein each of the application nodes comprises a component of a dependency pairing including a first application node of the dependency pairing that is configured to request and receive from a second application node of the dependency pairing, a response to the request. Edges are arranged and configured to provide interconnects between the application nodes in the graph and that determine a process and order of execution of requests incoming to the application nodes, wherein the application nodes are configured to: receive and process the incoming requests as determined by the edges by forwarding and processing data associated with the requests along the application nodes in the graph; and generate responses from each of the application nodes having a request, by first processing requests and generating responses at maximal application nodes, wherein the responses of the maximal application nodes are provided as inputs to other connected application nodes to enrich the requests of the other connected application nodes and then by processing the requests and generating responses at the other connected application nodes.

The details of one or more implementations are set forth in the accompanying drawings and the description below. Other features will be apparent from the description and drawings, and from the claims.

BRIEF DESCRIPTION OF THE DRAWINGS

FIG. 2C is a block diagram illustrating an example execution graph, according to an example embodiment.

FIG. 2D is an example block diagram illustrating example communications within the execution graph of FIG. 2C.

FIG. 2E is a block diagram illustrating an example execution graph, according to an example embodiment.

DETAILED DESCRIPTION

In general, a model-based architecture may be provided to enable application nodes to be arranged in a network or other organized group, where the application nodes are configured to communicate and exchange data with each other and with external systems. Each application node may be configured to perform a task, that when combined with the tasks performed by other application nodes in such a network or group may function to perform one or more actions.

Specializing the application nodes to perform different tasks may allow for reusability of various application nodes in the performance of any number of actions by combining them with other application nodes and/or in different orders of execution. The application nodes communicate with each other to collaborate to perform the actions. The communications among the application nodes and the communications between the application nodes and external systems may be based on request-response type of communication. In a request-response based communication system, a first application node 108 may request information from a second application node. The second application node may then respond to the request from the first application node by providing the requested information.

Figure 1:
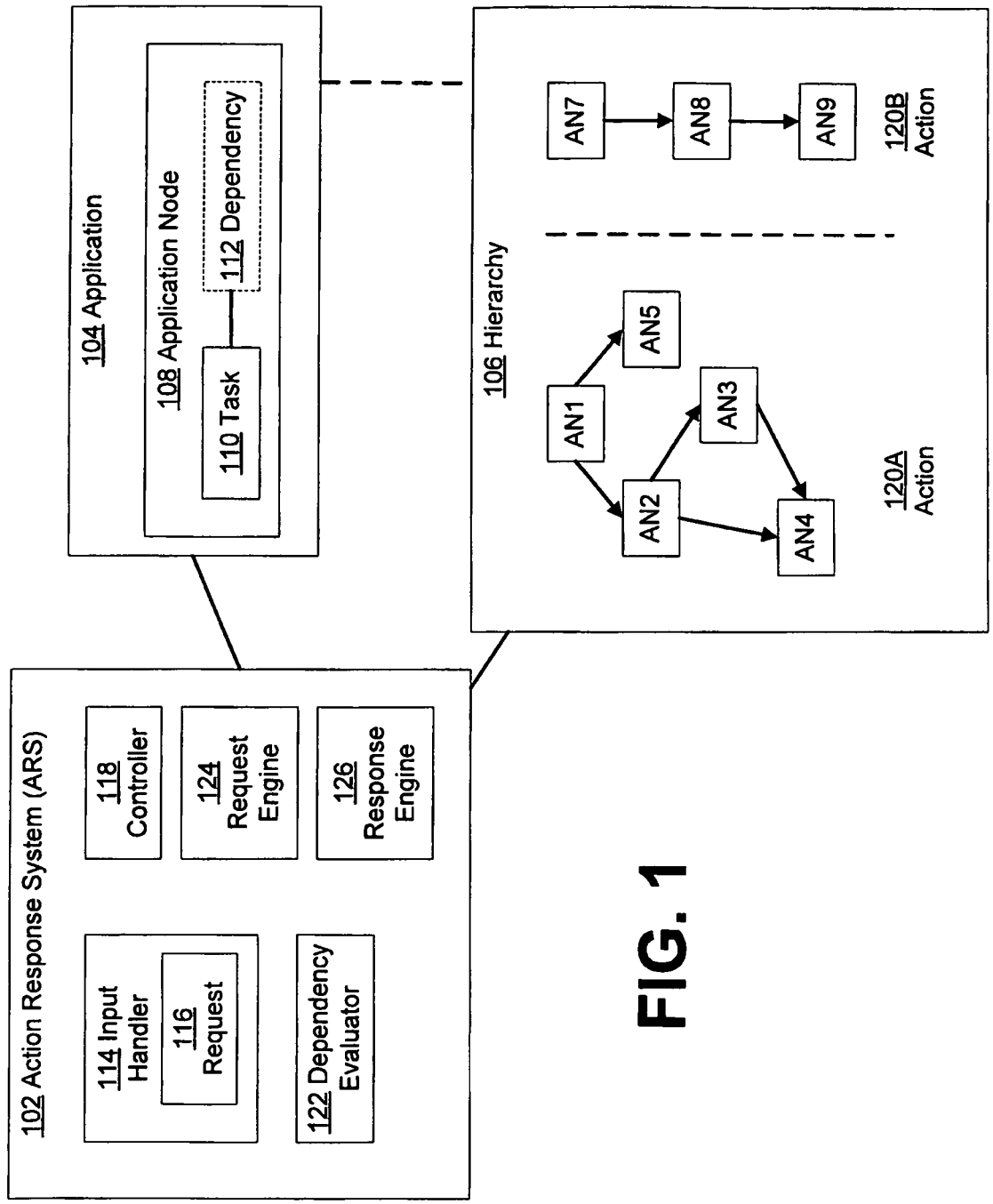
FIG. 1 is a block diagram that includes an example action response system (ARS), according to an example embodiment.

FIG. 1 is a block diagram that includes an example action response system (ARS) 102, according to an example embodiment. In the example of FIG. 1, the ARS 102 may enable multiple components or application nodes 108 of an application 104 to coordinate communication with each other, based on a hierarchy 106 of dependencies among the application nodes 108, to perform one or more complex functions or actions 120A, 120B.

The actions 120A, 120B may include any action or function that may be performed by the application 104. For example, the actions 120A and 120B may include playing a song on a digital music player, performing a calculation, or retrieving and/or manipulating data. Then for example, the application 104 may include multiple application nodes 108, each of which may be configured to perform one or more tasks 110 associated with the actions 120A, 120B. The actions 120A, 120B may represent units of work that may offer one or more pre-defined functions. The actions 120A, 120B may be configured to keep track of the context and take into account relationships, data and rule-based constraints. For example, the actions 120A, 120B may take into account request-response based communication that may be defined or otherwise exist amongst the application nodes 108 as referenced above.

The application nodes 108 may include components or sub-components of the application 104 that may be specialized to perform one or more tasks 110. Each application node 108 may include a modular part of the application 104 that accomplish a specific task. The application 104, may then, include an aggregation or other combination of the operations or tasks 110 performed by the application nodes 108, that together may accomplish or perform the actions 120A, 120B. The application nodes 108 may be able to receive a request coming in from other application nodes 108 or consumers to deliver data for this request through a response. The application nodes 108 may then enrich the requests to other application nodes 108 and receive corresponding responses.

The request may be used by an application node 108 to inquire for another application node 108 to perform a task 110. After the request has been processed by the other application node 108, and the task 110 performed, a response may be made available to the requesting application node 108. For example, the application 104 may include a mathematical application configured to perform basic mathematical functions or tasks 110 (e.g., addition, subtraction, multiplication and division) on a supplied set of inputs, numbers or formulas. Then, for example, the application 104 may include five application nodes 108, one to read the input, and four others each of which may be configured to perform one of the mathematical functions.

It may be that there exists a dependency 112 between two or more of the application nodes 108. The dependency 112 may include any situation in which in order for a first application node 108 to perform a first task 110, a second application node 108 must first perform a second task 110 (e.g., the first application node 108 may request a response from the second application node 108). The first application node 108 may then use the result or performance of the second task 110 by the second application node 108 to perform the first task 110. For example, to perform a mathematical equation that includes both addition and multiplication, an addition application node 108 may be dependent on the result from a multiplication application node 108, because in math multiplication is performed prior to addition. Thus, the addition application node 108 may share a dependency 112 (e.g., be dependent upon) the multiplication application node 108. In such an example, the addition node may request a response from the multiplication node upon which it is dependent.

According to an example embodiment, the application 104 may be configured to perform two actions 120A and 120B. The performance of the actions 120A, 120B may include the application nodes AN1-AN9 that share various dependencies 112, with each application node 108 performing one or more tasks 110 associated with the respective actions 120A, 120B. Based on the dependencies 112 among the application nodes 108, the application nodes 108 may be arranged into the hierarchy 106. For example, to perform the action 120A, AN 1 (application node 1) may be dependent on performances by AN2 and/or AN5. Then, for example, AN2, in order to perform its task 110, may be dependent upon receiving results from AN4 and/or AN3. Then for example, AN3 may be dependent upon AN4. Similarly for the action 120B, AN7 may be dependent upon AN8, which may be dependent on AN9.

Within the hierarchy 106, a lower level of the hierarchy 106 indicates a prior performance of a task 110. For example, to perform the action 120B, AN9, on the lowest level, would perform its task 110 prior to either AN8 or AN7 that are located on higher levels. Similarly, with regards to the action 120A, AN4 would perform its task prior to AN3, AN2 and AN1.

When two or more application nodes 108 share a dependency 112, they, together may be referred to as a dependency pairing, where a first application node 108 of the dependency pairing is arranged onto a higher level of the hierarchy 106 than the second application node 108 of the dependency pairing upon which the first application node 108 is dependent. For example, AN2 and AN4 may include a dependency pairing, where AN2 is on a higher level than AN4. Similarly AN4 and AN3 may include a dependency pairing, where AN3 is on a higher level than AN4 because it is dependent upon AN4.

According to an example embodiment, a dependency pairing may include one or more request-response pairs. In a request-response pair, a first application node 108 that is dependent upon a second application node 108 of a dependency pairing may request from the second application node 108 a response, including the performance of the second task 110 by the second application node 108, prior to performing the first task 110. Then, upon completing the second task 110, the second application node 108 may provide the response to the first application node 108. The request-response pair may enable a simple but effective means of communication between two or more application nodes 106 that share dependencies 112. Thus, a dependency 112 between a first and second application node 108 may be predicated upon a definition of a request-response pair between the two application nodes 108.

A request 116 to perform one or more of the actions 120A, 120B may be received by an input handler 114. The request 116 may include a request or command received from a customer or other application (e.g., other external application) to perform one or more actions 120A, 120B. For example, on a digital music player, when a user presses the play button, this may be received by the input handler 114 as the request 116 to perform the action 120A. The input handler 114 may include any module configured to receive, retrieve or otherwise determine the request 116.

A controller 118 may be configured to determine whether or not the request 116 is valid. For example, the controller 118 may determine which action 120A, 120B is being requested (e.g., via the request 116) and may compare the request 116 to the actions 120A, 120B that may be performed by the application 104. Then, for example, if the request 116 includes an action 120A, 120B that may be performed by the application 104 the request 116 may be deemed to be valid. Or, for example, if the request 116 includes a different action (not shown), and the requested action is not among the actions 120A, 120B that may be performed by the application 104, the request 116 may be deemed invalid. In other example embodiments, the request 116 may include or reference one or more application nodes 108, and the controller 118 may then compare the requested application node(s) 108 to the available application nodes 108 from the application 104 to determine a validity of the request 116.

A dependency evaluator 122 may be configured to determine which of the application nodes 108 are necessary or otherwise involved in fulfilling the request 116, including the requested action(s) 120A, 120B. For example, the request 116 may request the action 120A. Then, for example, the dependency evaluator 122 may determine that the AN1 is required to perform the action 120A. Then, for example, based on the dependencies 112, the dependency evaluator 122 may further determine that AN2, AN3, AN4 and AN5 may be needed as well and may arrange the application nodes 108 into the hierarchy 106, based on their dependencies 112, as shown in the example of FIG. 1.

A request engine 124 may be configured to provide the request 116, or at least a relevant portion thereof, to one or more of the application nodes 108 from the hierarchy 106. As referenced above, the lower level application nodes 108 of the hierarchy 106 may perform their tasks 110 prior to higher level application nodes 108. Thus, the request engine 124 may determine to which of the low level application node(s) 108 from the hierarchy to provide the request 116. For example, to perform the action 120B, the request engine 124 may provide the request 116 to AN9, or to perform the action 120A, the request engine 124 may provide the request 116 to AN4 and AN5.

Upon completion of the tasks 110 by the lowest level application nodes 108, the lowest level application nodes 108 may then provide one or more responses up to the next level application node(s) 108 within the hierarchy 106 with which a dependency 112 is shared. For example, upon completion of its task, AN4 may provide a response to AN2 and/or AN3. Similarly, AN9 may provide a response to AN8. This sequence may be repeated until the highest level application nodes 108 (e.g., AN1, AN7) associated with performing the action 120A, 120B receive responses from all the application nodes 108 upon which they depend. Then, for example, the highest level application nodes AN1 and AN7 may perform their respective tasks 110 and provide a response to a response engine 126.

The response engine 126 may be configured to accumulate the responses from each of the lower level application nodes 108 of the hierarchy and generate a final response to the request 116. For example, upon completion of its task 110, AN1 may provide a response to the response engine 126. The response engine 126 may then, for example, combine that response fro AN1 with any other received responses associated with the requested action 120A and provide a final response to the request 116.

The action response system (ARS) 102 may allow a user or developer to manage complex communications between multiple application nodes 108 of an application 104 that may share a multi-level dependency (e.g., dependency 112) structure. The dependency 112 may be created and/or modified by modifying a request response pair between two or more of the application nodes 108. This may allow a simple way to define complex execution patterns across one or more platforms or applications 104.

Figure 2A:
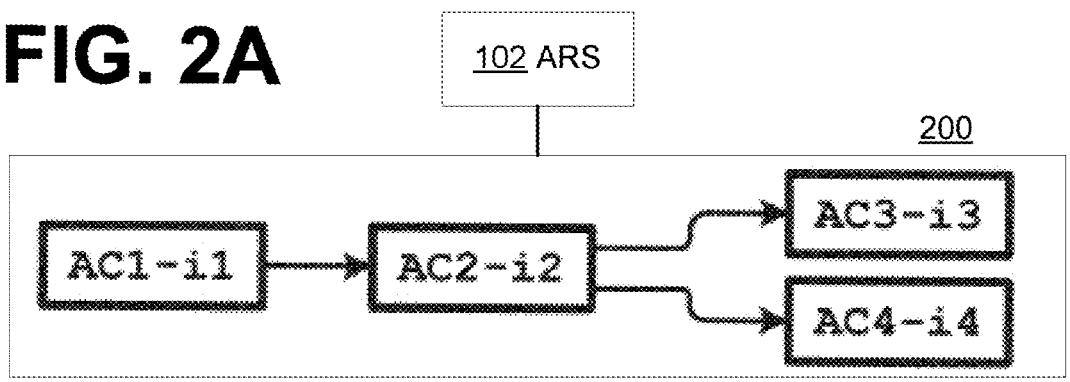
FIG. 2A is a block diagram illustrating an example execution graph, according to an example embodiment.

FIG. 2A is a block diagram illustrating an example execution graph 200, according to an example embodiment. In the example of FIG. 2A, the execution graph 200 may be similar to the hierarchy 106 of FIG. 1 displaying dependencies among application nodes 108. The execution graph 200 may illustrate one or more network execution patterns among the application nodes 108 to accomplish one or more of the actions 120A, 120B or other functionality. The execution graph 200 may provide a model of communication among the application nodes 108, where the technical details about the platforms, languages and applications may be abstracted. The execution graph 200 may enable multi-channel or multi-node communication that generalizes point-to-point communication (e.g., using request-response pairs).

Figure 2B:
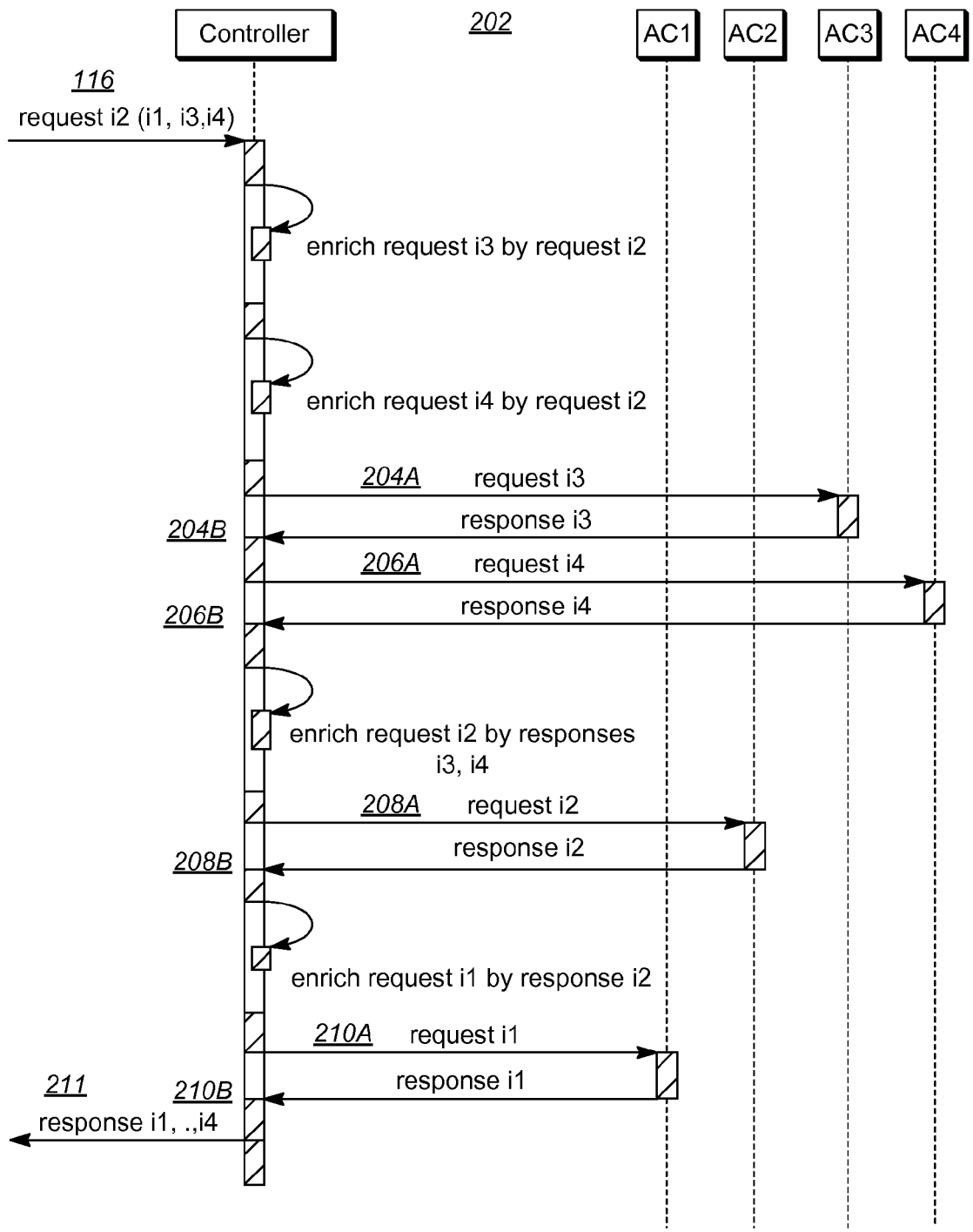
FIG. 2B is a flow chart illustrating example operations of the execution graph of FIG. 2A, according to an example embodiment.

In the example of FIG. 2A, the ARS 102 may manage communication among the application nodes AC1, AC2, AC3 and AC4 of the execution graph 200. The example operations of the execution graph 200 may be shown by the flow chart 202 of FIG. 2B.

The ARS 102 may receive a request 116 that requests a performance of an action performed by the application nodes AC1-AC4 of execution graph 200. The ARS 102 may then analyze the execution graph 200 to determine that AC1 is dependent upon a performance by AC2 which is dependent upon both AC3 and AC4. While AC1 and AC2 share a direct dependency, ARS 102 may enrich the request 116 to include requests to AC3 and AC4. 204A and 204B may represent a request-response pair, where the request 204A is sent by the ARS 102 to AC3 and AC3 responds with response 204B. Similarly, a request-response pair 206A and 206B may be associated with AC4 that receives request 206A and responds with response 206B.

The ARS 102 may receive the responses 204B and 206B and enrich request 208A by the responses and provide them to AC2 (that as discussed above, may be dependent upon receiving the responses 204B and 206B). The ARS 102 may then receive from AC2 the response 208B which may be used to enrich the request 210A to AC1, which may respond with response 210A. The ARS 102 may then process the received final response 211 (e.g., from response 210A) and provide it responsive to the request 116 and/or perform some additional processing or manipulation to the received responses (e.g., 204B, 206B, 208B and 210B) to generate and then provide the final response 211. The final response 211 may include a combination of all the responses generated (e.g., 204B, 206B, 208B, and 210B).

FIG. 2C is a block diagram illustrating an example execution graph 212, according to an example embodiment. FIG. 2D is an example block diagram illustrating example communications within the execution graph 212 of FIG. 2C. In step 214A, a request may be received at the application node AC1. In steps 214B, 214C and 214D hollow requests may be provided to the application nodes AC2, AC3 and AC4, respectively. The requests 214A-D may push data to the application nodes AC1-AC4, however unlike the request 214A, the hollow requests 214B-D may not require a direct or immediate response. Upon determining a dependency between AC1 and AC2 (based on the execution graph 212), a forward request push 216 may provide data of the incoming request (e.g., 214A) to AC2. At AC2, a response 218 may be created. The response 218 may then be provided via backward response pushes 220 to those application nodes (e.g., AC1 and AC3) dependent upon a response (e.g., 218) from AC2. The application nodes AC1 and AC3 may then generate responses 222A and 222B, respectively, after receiving and processing the data from 220. The application node AC4 may be unaffected by the execution of the execution graph 212 except for the generation of the hollow request 214D. According to an example embodiment, each node involved in the processing (e.g., AC1, AC2, AC3), may provide its response (e.g., 222A, 218, 222B) to the client or node from which the request 214A was received by AC1. In another example embodiment, the responses 222A, 218, and 222B may be combined, at least in part, prior to being provided back to the requesting client or node.

FIG. 2E is a block diagram illustrating an example execution graph 224, according to an example embodiment. The execution graph 224 may include a modified version of the execution graph 212 where the application node AC4 would include a greater role in the processing of the request 214A beyond just receiving the hollow request 214D.

Figure 2F:
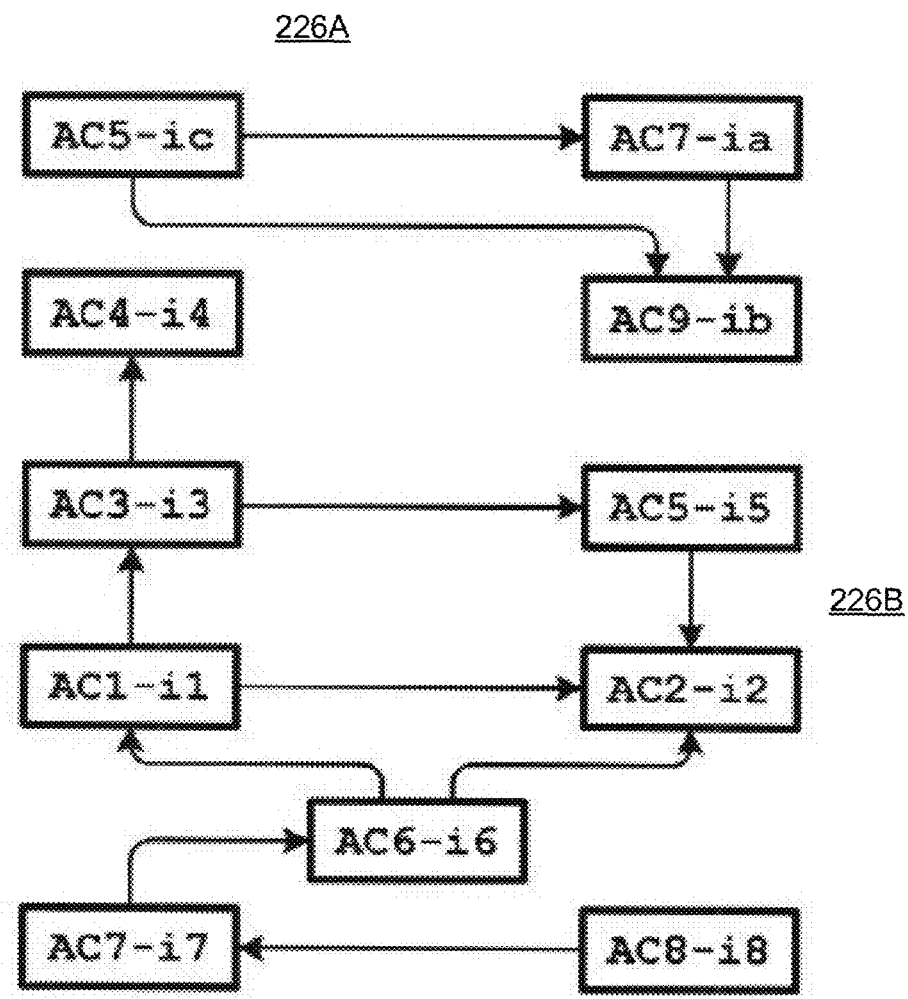
FIG. 2F is a block diagram illustrating an example core network, according to an example embodiment.

FIG. 2F is a block diagram illustrating an example core network 225, according to an example embodiment. The core network 225 may include two or more execution graphs 226A and 226B. Though the execution graphs 226A and 226B may not be connected to each other, they may include application nodes from the same pool or same application.

In the core network 225, each node on the graphs 226A and 226B may include a tuple including an application node (e.g., ACx) and a request-response pair identifier (e.g., ix), where 'x' is a variable. Thus, for example, AC5-ic may indicate the application node AC5 and request response pair ic. Including the nodes of the core network 225 as tuples may allow reuse of the application nodes in a plurality of execution graphs 226A, 226B.

Figure 3:
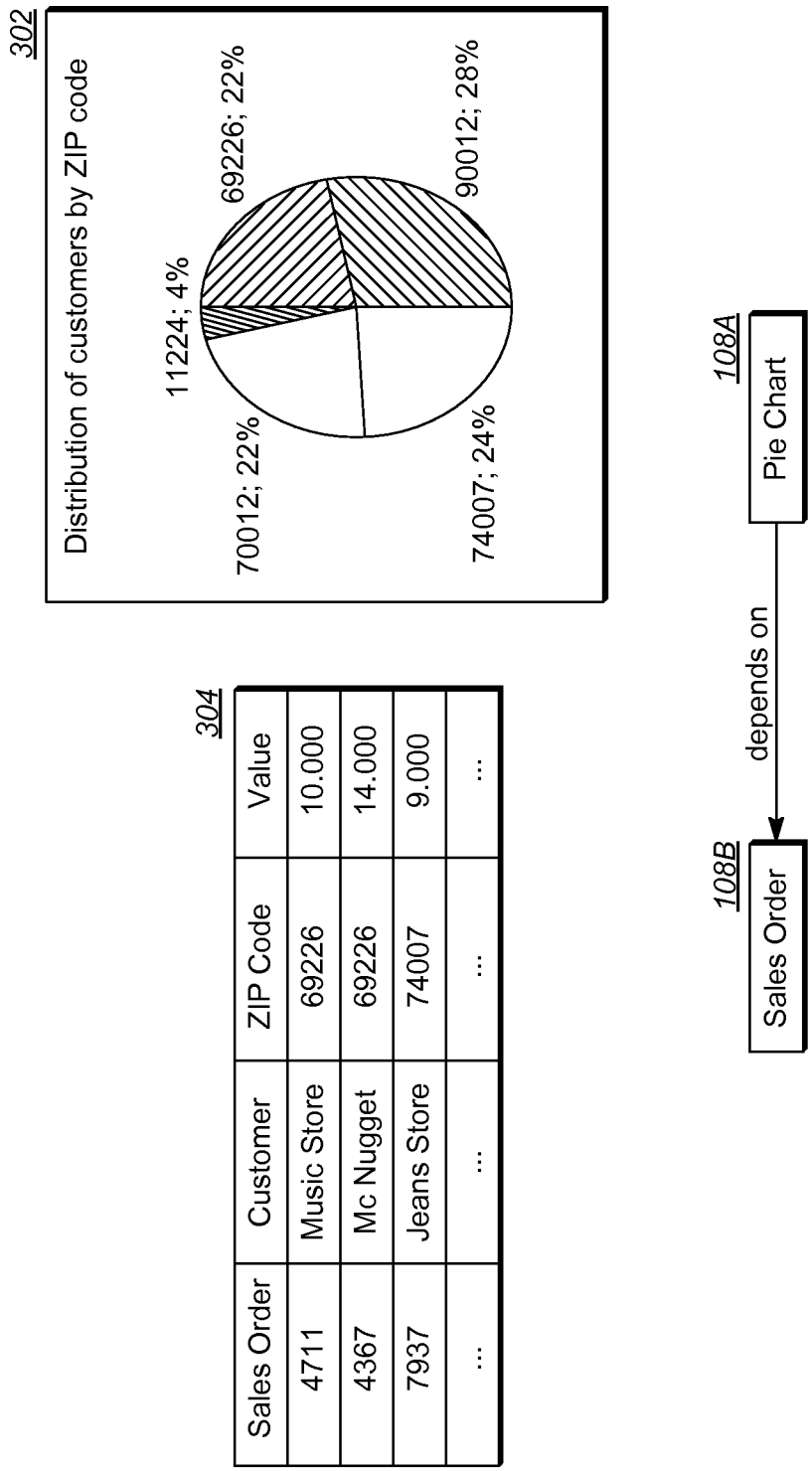
FIG. 3 is a block diagram illustrating an example dependency of FIG. 1, according to an example embodiment.

FIG. 3 is a block diagram illustrating an example dependency 112 of FIG. 1, according to an example embodiment. In the example of FIG. 3, the pie chart 302 may be dependent on the 'Sales Order' column of the chart 304. The dependency between the pie chart 302 and chart 304 may be shown in the application nodes 108A and 108B that share a dependency 112 and comprise a dependency pairing. Then, for example, if the values of one or more of the sales orders from the chart 304 changes, this change may be reflected in the distribution of the pie chart 302.

In an application, for example, the dependency 112 between the application nodes 108A and 108B may be used when a user tries to update the pie chart 302. An update of the pie chart 302 may be dependent upon receiving updated information from the chart 304. Then, for example, to update of the pie chart 302, the application node 108A may request from the application node 108B a response including an update of the chart 304.

Figure 4:
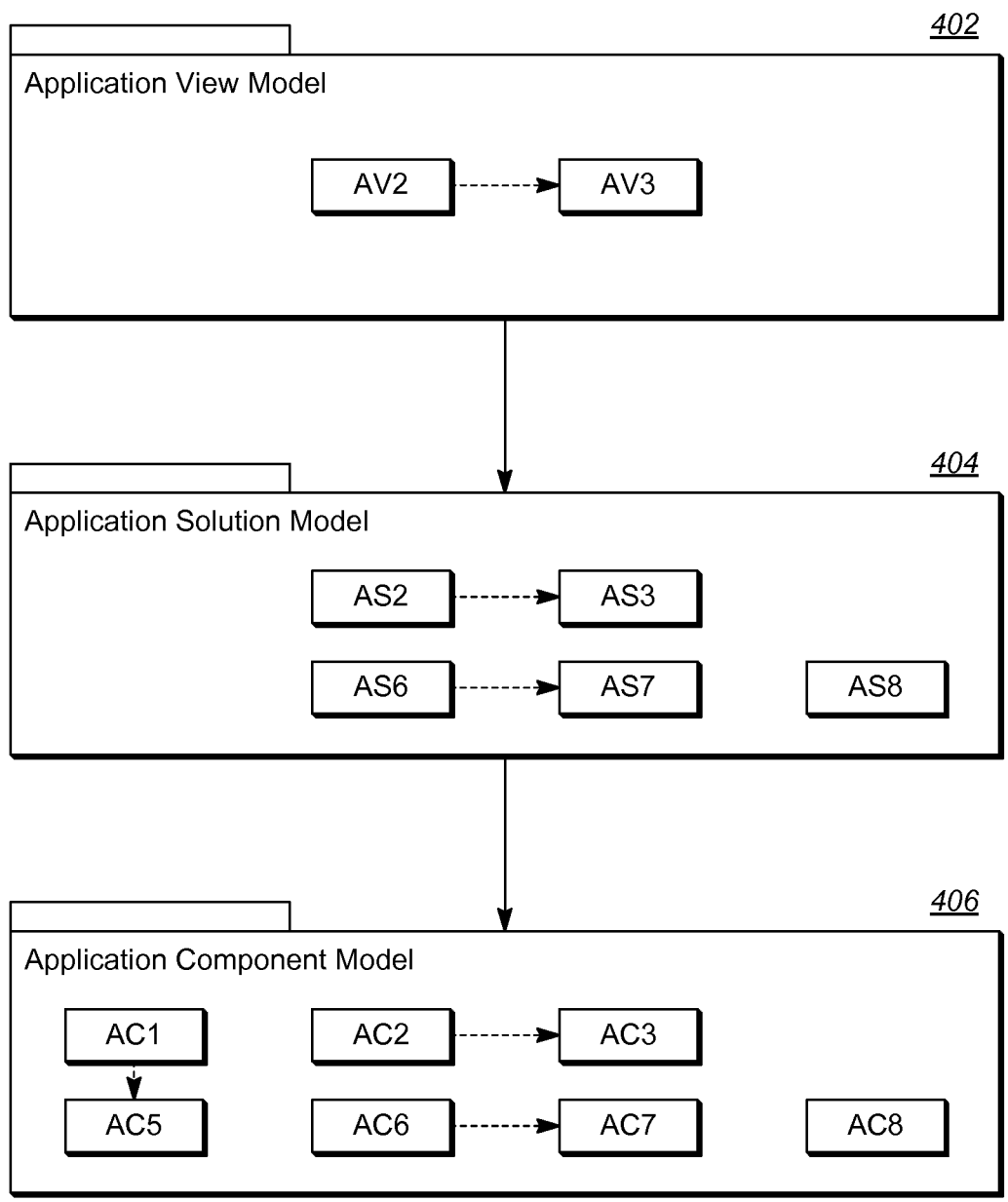
FIG. 4 is a block diagram of an example application of FIG. 1, according to an example embodiment.

FIG. 4 is a block diagram of an example application 104 of FIG. 1, according to an example embodiment. The application 104 may be subdivided into various layers of abstraction (402, 404, and 406) where only a portion of the application nodes 108 may be visible or otherwise accessible at each level. For example, the application view model 402 may include the layer at which a consumer uses the application 104, and really only needs to see the application nodes AV2 and AV3. Then, for example, the application the consumer or client is using may perform, for the specific action request, processing using nodes AS2, AS3, AS6, AS7 and AS8. But also, for example, the application 104 may be capable of performing a larger number of actions, other than simply that which may have been requested and may include the other nodes AC1 and AC5 that were not referenced at the 402 or 404 abstraction layers.

In other example embodiments, the components of the action response system 102 also may or correspondingly be subdivided into various abstraction layers based on the abstraction layers 402, 404 and 406. Then for example, multiple dependency evaluators 122 may exist on different abstraction layers. For example, a dependency evaluator 122 on the abstraction layer 402 may only determine the dependency 112 between AV2 and AV3. However, a dependency evaluator 122 on the abstraction layer 404 may determine the dependencies 112 between AS2 and AS3 as well as AS6 and AS7, and may recognize the application node 108 AS8.

Figure 5:
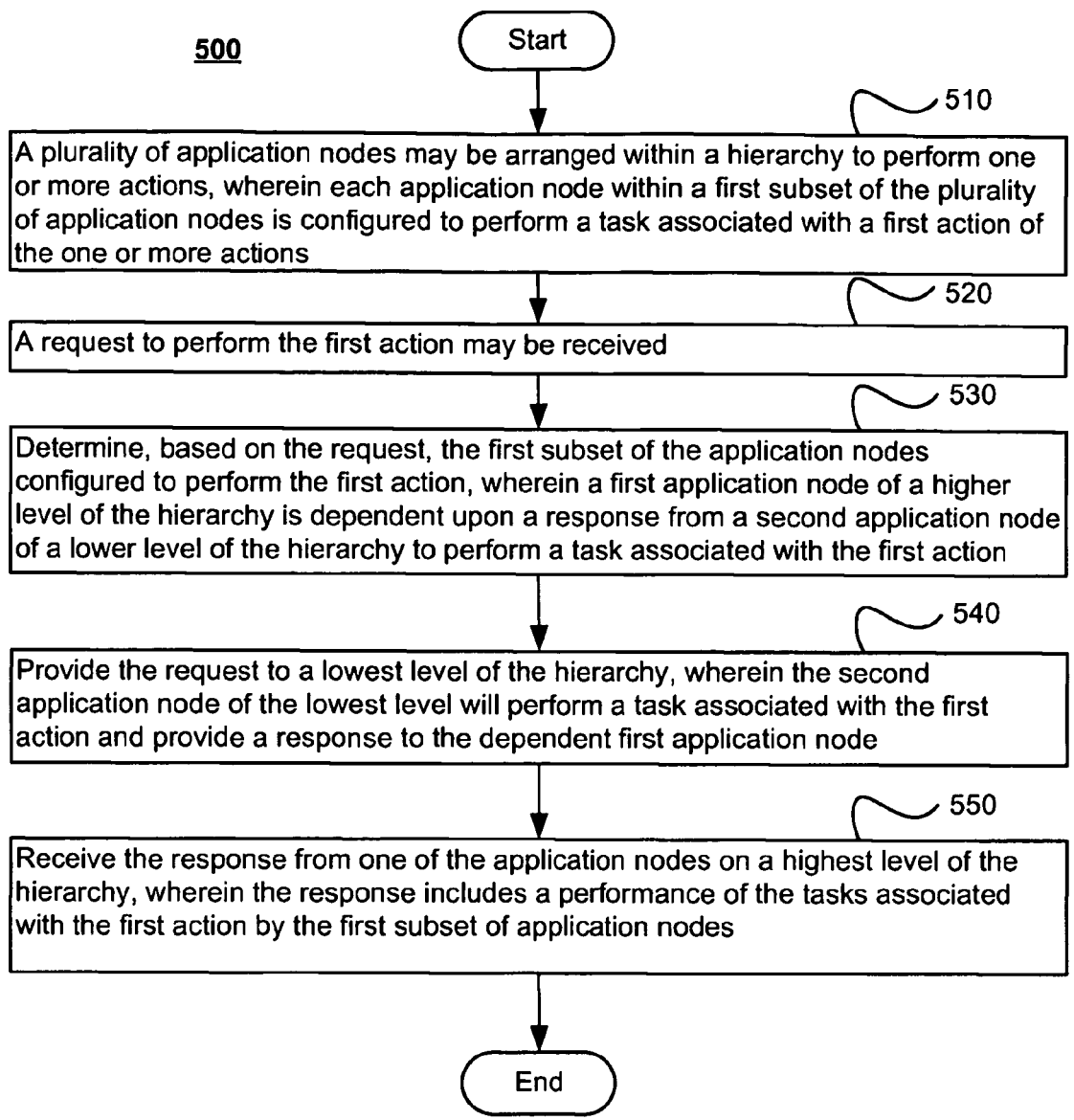
FIG. 5 is a flowchart illustrating example operations of the system of FIG. 1, according to an example embodiment.

FIG. 5 is a flowchart 500 illustrating example operations of the system 100 of FIG. 1, according to an example embodiment. More specifically, FIG. 5 illustrates an operational flow 500 representing example operations related to the action response system (ARS) 102.

After a start operation, a plurality of application nodes may be arranged within a hierarchy to perform one or more actions, wherein each application node within a first subset of the plurality of application nodes is configured to perform a task associated with a first action of the one or more actions. (510). For example, as shown in FIG. 1, the dependency evaluator 122 may arrange the application nodes 108 within the hierarchy 106 to perform the actions 120A and 120B, where each application node 108 is configured to perform a task 110 associated with the actions 120A, 120B.

A request to perform the first action may be received (520). For example, the input handler 114 may receive the request 116 to perform the action 120A.

The first subset of the application nodes configured to perform the first action may be determined based on the request, wherein a first application node of a higher level of the hierarchy is dependent upon a response from a second application node of a lower level of the hierarchy to perform a task associated with the first action (530). For example, the dependency evaluator 122 may determine the application nodes 108 AN1, AN2, AN3, AN4 and AN5 are needed to perform the request 116, wherein AN1 is dependent upon a response from AN2 to perform the task 110 associated with AN1.

The request may be provided to a lowest level of the hierarchy, wherein the second application node of the lowest level will perform a task associated with the first action and provide a response to the dependent first application node (540). For example, the request engine 124 may provide the request 116 to the lowest level of the hierarchy 106 (e.g., AN4 and AN5) to perform their associated tasks 110 and respond to AN1.

The response may be received from one of the application nodes on a highest level of the hierarchy, wherein the response includes a performance of the tasks associated with the first action by the first subset of application nodes (550).

For example, the response engine 126 may receive a response form AN1, including a performance of the tasks 110 associated with the action 120A.

Figure 6:
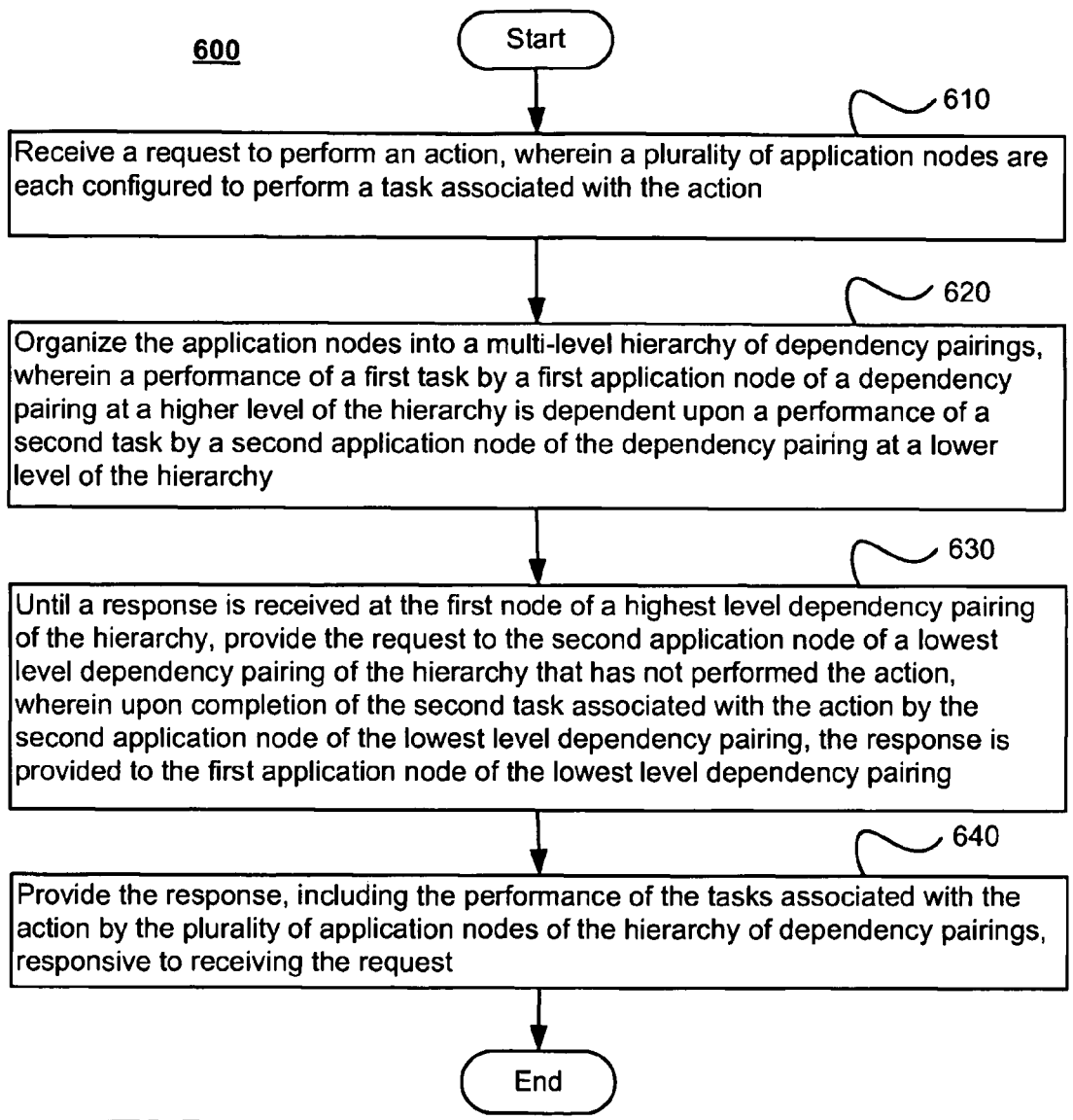
FIG. 6 is a flowchart illustrating example operations of the system of FIG. 1, according to an example embodiment.

FIG. 6 is a flowchart 600 illustrating example operations of the system 100 of FIG. 1, according to an example embodiment. More specifically, FIG. 6 illustrates an operational flow 600 representing example operations related to a action response system (ARS) 102.

After a start operation, a request to perform an action may be received, wherein a plurality of application nodes are each configured to perform a task associated with the action (610). For example, as shown in FIG. 1, the input handler 114 may receive the request 116 to perform the action 120B, wherein the application nodes AN7, AN8 and AN9 are configured to perform a task 110 associated with the action 120B.

The application nodes may be organized into a multi-level hierarchy of dependency pairings, wherein a performance of a first task by a first application node of a dependency pairing at a higher level of the hierarchy is dependent upon a performance of a second task by a second application node of the dependency pairing at a lower level of the hierarchy (620). For example, the dependency evaluator 122 may organize the application nodes 108 into the hierarchy 106 of dependency pairings, wherein a performance of a first task 110 by AN7 is dependent upon a performance of a second task 110 by AN8.

Until a response is received at the first node of a highest level dependency pairing of the hierarchy, the request may be provided to the second application node of a lowest level dependency pairing of the hierarchy that has not performed the action, where upon completion of the second task associated with the action by the second application node of the lowest level dependency pairing, the response is provided to the first application node of the lowest level dependency pairing (630). For example, the request engine 124 may provide the request 116 to AN9, which may provide a response to AN8. Then for example, the request 116 may be provided to AN8 which may provide a response to AN7.

The response, including the performance of the tasks associated with the action by the plurality of application nodes of the hierarchy of dependency pairings, may be provided responsive to receiving the request. (640). For example, the response engine 126 may provide a response, including the performance of tasks 110 by AN7, AN8 and AN9, responsive to the request 116.

Figure 7:
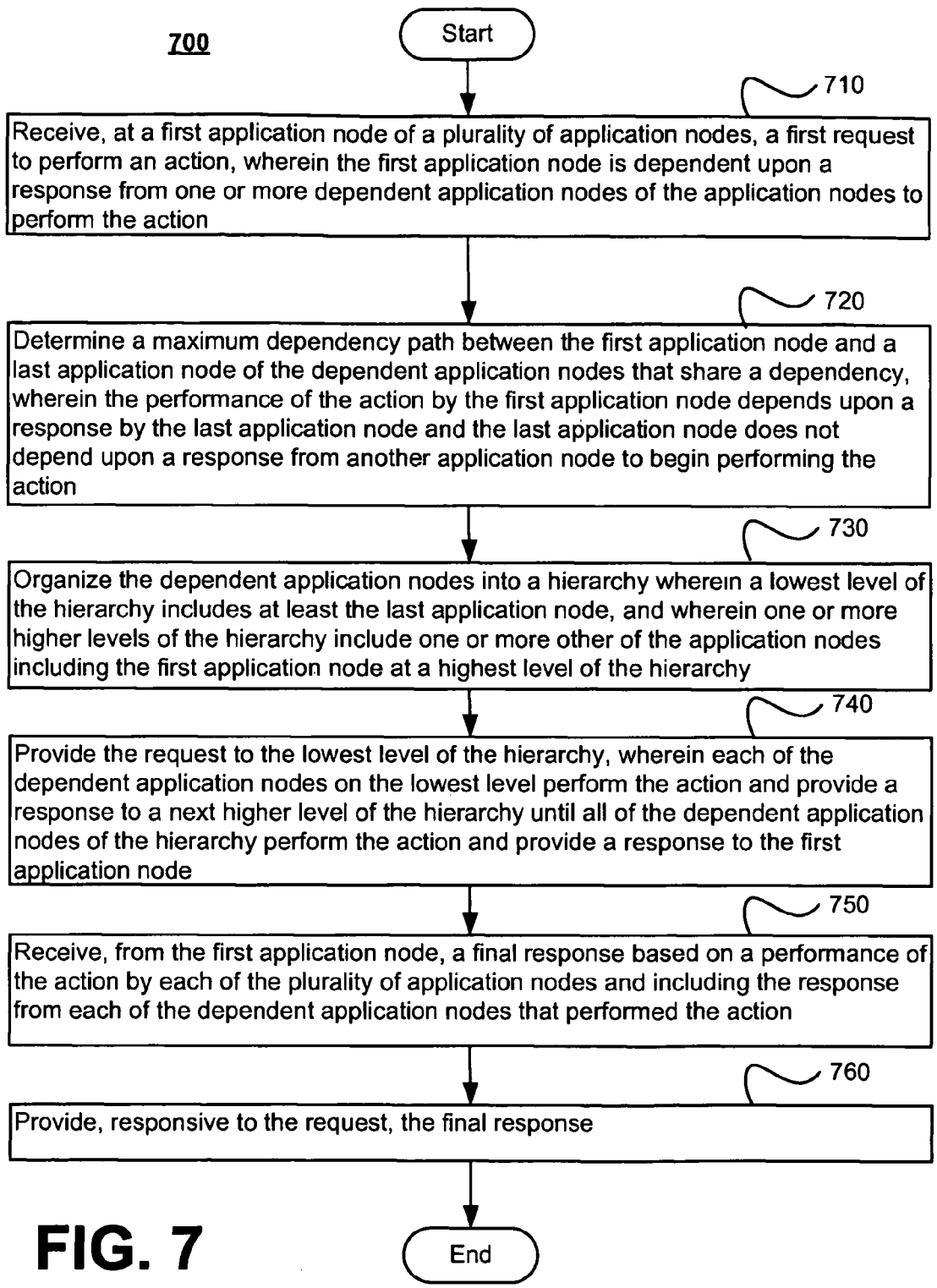
FIG. 7 is a flowchart illustrating example operations of the system of FIG. 1, according to an example embodiment.

FIG. 7 is a flowchart 700 illustrating example operations of the system 100 of FIG. 1, according to an example embodiment. More specifically, FIG. 7 illustrates an operational flow 700 representing example operations related to a action response system (ARS) 102.

After a start operation, a first request to perform an action may be received at a first application node of a plurality of application nodes, where the first application node is dependent upon a response from one or more dependent application nodes of the application nodes to perform the action (710). For example, as shown in FIG. 1, the application node 108 AN7 may receive the request 116 (e.g., from the request engine 124), wherein AN7 is dependent upon a response from the application nodes 108 AN8 and AN8 to perform the action 120B.

A maximum dependency path may be determined between the first application node and a last application node of the dependent application nodes that share a dependency, where the performance of the action by the first application node depends upon a response by the last application node and the last application node does not depend upon a response from another application node to begin performing the action (720). For example, the dependency evaluator 122 may determine a maximum dependency path between AN1 and AN4, wherein AN1 depends on AN4, but AN4 does not depend on another application node 104.

The dependent application nodes may be organized into a hierarchy wherein a lowest level of the hierarchy includes at least the last application node, and where one or more higher levels of the hierarchy include one or more other of the application nodes including the first application node at a highest level of the hierarchy (730). For example, the dependency evaluator 122 may organize the application nodes 108 into the hierarchy 106, including AN1 at a highest level and AN4 at a lowest level.

The request may be provided to the lowest level of the hierarchy, wherein each of the dependent application nodes on the lowest level perform the action and provide a response to a next higher level of the hierarchy until all of the dependent application nodes of the hierarchy perform the action and provide a response to the first application node (740). For example, the request engine 124 may provide the request 116 to the lowest level of the hierarchy 106 at AN4, which performs the task 110 associated with the action 120A and responds to the next higher level. Then, for example, the remaining higher level application nodes 108 perform their tasks 110, until a response is received by the highest level application node AN1 for the action 120A.

A final response based on a performance of the action by each of the plurality of application nodes and including the response from each of the dependent application nodes that performed the action may be received from the first application node (750). For example, the response engine 126 may receive one or more responses based on the performances by the application nodes 108 of the hierarchy 106.

The final response may be provided responsive to the request (760). For example, the response engine 126 may provide a final response responsive to the request 116.

Figure 8:
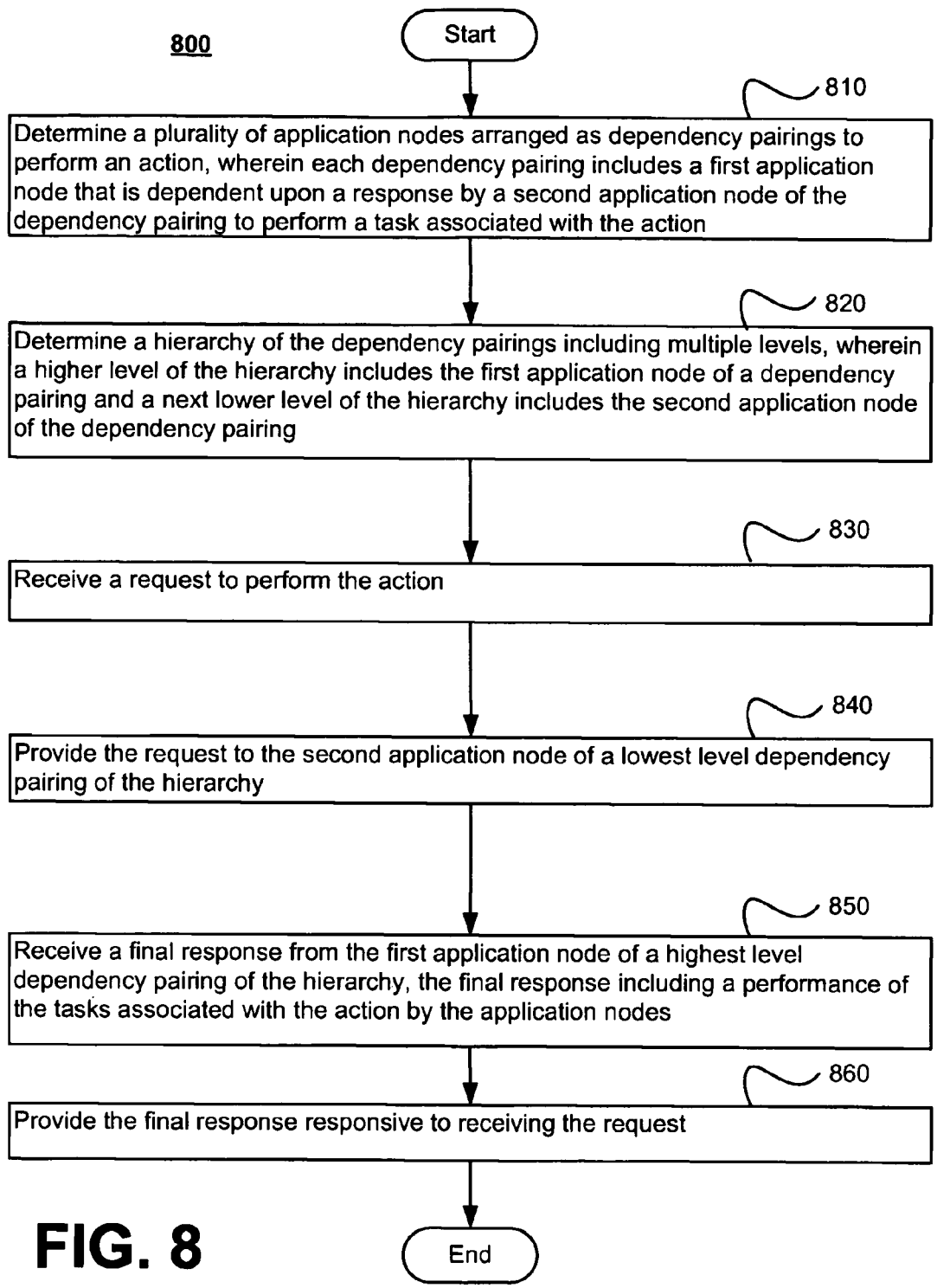
FIG. 8 is a flowchart illustrating example operations of the system of FIG. 1, according to an example embodiment.

FIG. 8 is a flowchart 800 illustrating example operations of the system 100 of FIG. 1, according to an example embodiment. More specifically, FIG. 8 illustrates an operational flow 800 representing example operations related to a action response system (ARS) 102.

After a start operation, a plurality of application nodes may be determined to be arranged as dependency pairings to perform an action, where each dependency pairing includes a first application node that is dependent upon a response by a second application node of the dependency pairing to perform a task associated with the action (810). For example, as shown in FIG. 1, the dependency evaluator 122 may determine the application nodes 108 are arranged as dependency pairings to perform the actions 120A, 120B, where each dependency pairing includes a first application node 108 dependent upon a response by a second application node 108 to perform a task 110 associated with the actions 120A, 120B.

A hierarchy of the dependency pairings including multiple levels may be determined, wherein a higher level of the hierarchy includes the first application node of a dependency pairing and a next lower level of the hierarchy includes the second application node of the dependency pairing (820). For example, the dependency evaluator 122 may determine the hierarchy 106 of dependency pairings 106.

A request to perform the action may be received (830). For example, the input handler 114 may receive the request 116.

The request may be provided to the second application node of a lowest level dependency pairing of the hierarchy (840). For example, the request engine 124 may provide the request 116 to AN9, which may be the second application node of the lowest level dependency of the hierarchy 106 (associated with action 120B).

A final response may be received from the first application node of a highest level dependency pairing of the hierarchy, the final response including a performance of the tasks associated with the action by the application nodes (850). For example, the response engine 126 may receive a final response from AN7, the final response including a performance of the tasks 110 by AN7, AN8 and AN9.

The final response may be provided responsive to receiving the request (860). For example, the response engine 126 may provide the final response responsive to the input handler 114 receiving the request 116.

Figure 9:
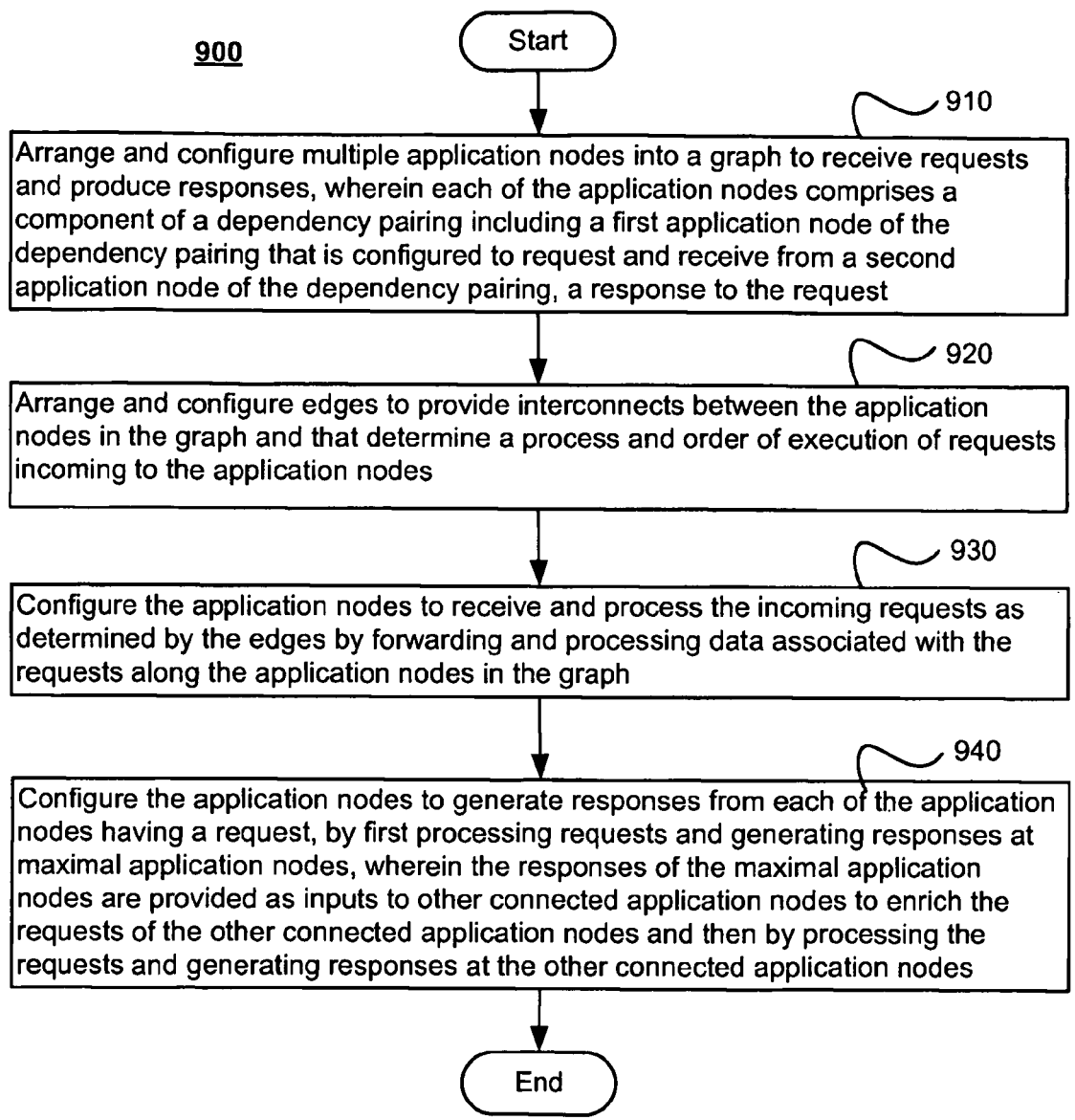
FIG. 9 is a flowchart illustrating example operations of the system of FIG. 1 and FIG. 2A, according to an example embodiment.

FIG. 9 is a flowchart 900 illustrating example operations of the system 100 of FIG. 1 and FIG. 2A, according to an example embodiment. More specifically, FIG. 9 illustrates an operational flow 900 representing example operations related to a action response system (ARS) 102.

After a start operation, multiple application nodes may be arranged into a graph and configured to receive requests and produce responses, wherein each of the application nodes comprises a component of a dependency pairing including a first application node of the dependency pairing that is configured to request and receive from a second application node of the dependency pairing, a response to the request (910). For example, as shown in FIG. 1 and FIG. 2A, the dependency evaluator 122 may arrange the application nodes 108 into the execution graph 200, wherein each application node (e.g., AC1-AC4) comprises a component of a dependency pairing.

Edges may be arranged and configured to provide interconnects between the application nodes in the graph and that determine a process and order of execution of requests incoming to the application nodes (920). For example, the edges (e.g., the arrowed lines) of the execution graph 200 may determine a process and order of requests incoming to the application nodes 108.

The application nodes may be configured to receive and process the incoming requests as determined by the edges by forwarding and processing data associated with the requests along the application nodes in the graph (930). For example, the application nodes 108 (e.g., AC1-AC4) may be configured to receive and process the request 116.

The application nodes may be configured to generate responses from each of the application nodes having a request, by first processing requests and generating responses at maximal application nodes, wherein the responses of the maximal application nodes are provided as inputs to other connected application nodes to enrich the requests of the other connected application nodes and then by processing the requests and generating responses at the other connected application nodes (940). For example, the application nodes 108 may receive the request 116 and generate responses that may be provided to other application nodes 108 to perform the actions 120A, 120B.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A system comprising:
   at least one memory configured to store executable code; and
   at least one processor operably coupled to the at least one memory and configured to execute the code to cause the system to have:
      a plurality of application nodes arranged within a hierarchy to perform one or more actions that each include one or more pre-defined functions of an application and that each utilize a request-response based communication defined among the plurality of application nodes, wherein each application node within a first subset of the plurality of application nodes is configured to perform a task associated with a first action of the one or more actions;
      an input handler configured to receive a request to perform the first action;
      a dependency evaluator configured to determine, based on the request, the first subset of the application nodes configured to perform the first action, wherein a first application node of a higher level of the hierarchy is dependent upon a response from a second application node of a lower level of the hierarchy to perform a task associated with the first action;
      a request engine configured to provide the request to a lowest level of the hierarchy, wherein the second application node of the lowest level will perform a task associated with the first action and provide a response to the dependent first application node; and
      a response engine configured to receive the response from one of the application nodes on a highest level of the hierarchy, wherein the response includes a performance of the tasks associated with the first action by the first subset of application nodes.

2. The system of claim 1 further comprising a controller configured to determine a validity of the request based on a comparison of the first action to the plurality of application nodes of the hierarchy.

3. The system of claim 1 wherein the plurality of application nodes comprise one or more interrelated networks of an application configured to perform the one or more actions.

4. The system of claim 2 wherein the controller is configured to determine the request to be invalid based upon a determination that a performance of the first action requires a task to be performed by one of the plurality of application nodes outside of the first subset.

5. The system of claim 1 wherein the dependency evaluator is configured to assemble the hierarchy based upon dependencies among the application nodes of the first subset configured to perform the action.

6. The system of claim 1 wherein the request engine is configured to push the request from the highest level of the hierarchy to the lowest level of the hierarchy along a network execution path.

7. The system of claim 6 wherein the response engine is configured to receive the response to the request from the lowest level of the hierarchy using the network execution path, wherein the application nodes between the lowest level and the highest level each perform a task associated with the first action and include a result of the performance of the task in the response.

8. A method comprising:
receiving a request to perform an action that includes a pre-defined function of an application, wherein the action utilizes a request-response based communication defined among a plurality of application nodes, wherein the plurality of application nodes are each configured to perform a task associated with the action;
organizing the application nodes into a multi-level hierarchy of dependency pairings, wherein a performance of a first task by a first application node of a dependency pairing at a higher level of the hierarchy is dependent upon a performance of a second task by a second application node of the dependency pairing at a lower level of the hierarchy;
repeating, until a response is received at the first node of a highest level dependency pairing of the hierarchy, providing the request to the second application node of a lowest level dependency pairing of the hierarchy that has not performed the action, wherein upon completion of the second task associated with the action by the second application node of the lowest level dependency pairing, the response is provided to the first application node of the lowest level dependency pairing; and
providing the response, including the performance of the tasks associated with the action by the plurality of application nodes of the hierarchy of dependency pairings, responsive to receiving the request.

9. The method of claim 8 wherein the receiving comprises receiving the request to perform the action, wherein the plurality of application nodes are each configured to provide requests to and receive responses from one or more application nodes upon which they are dependent to perform their task associated with the action.

10. The method of claim 8 wherein the providing comprises:
assembling a final response based on a plurality of responses received from each of the lower level application nodes performing their task; and
providing the final response.

11. A method comprising:
receiving, at a first application node of a plurality of application nodes, a first request to perform an action that includes a pre-defined function for an application, wherein the first application node is dependent upon a response from one or more dependent application nodes of the application nodes to perform the action;
determining a maximum dependency path between the first application node and a last application node of the dependent application nodes that share a dependency, wherein the performance of the action by the first application node depends upon a response by the last application node and the last application node does not depend upon a response from another application node to begin performing the action;
organizing the dependent application nodes into a hierarchy wherein a lowest level of the hierarchy includes at least the last application node, and wherein one or more higher levels of the hierarchy include one or more other of the application nodes including the first application node at a highest level of the hierarchy;
providing the request to the lowest level of the hierarchy, wherein each of the dependent application nodes on the lowest level perform the action and provide a response to a next higher level of the hierarchy until all of the dependent application nodes of the hierarchy perform the action and provide a response to the first application node;
receiving, from the first application node, a final response based on a performance of the action by each of the plurality of application nodes and including the response from each of the dependent application nodes that performed the action; and
providing, responsive to the request, the final response.

12. The method of claim 11 wherein the determining a maximum dependency path comprises determining the maximum dependency path including a plurality of dependent application nodes between the first application node and the last application node.

13. The method of claim 11 wherein the organizing comprises organizing the hierarchy into a plurality of levels wherein the first application node shares either a direct or indirect dependency with each other of the application nodes on one or more lower levels.

14. The method of claim 11 wherein the providing comprises providing the request to the lowest level of the hierarchy, wherein each of the dependent application nodes on the lowest level perform the action and provide a response to the next higher level of the hierarchy and wherein the response includes the request to perform the action.

15. The method of claim 11 wherein the receiving comprises receiving, at a first application node of a plurality of application nodes, a first request to perform the action, wherein each of the plurality of application nodes is configured to perform a task associated with a performance of the action.

16. A system comprising:
at least one memory configured to store executable code; and
at least one processor operably coupled to the at least one memory and configured to execute the code to cause the system to have:
a plurality of application nodes each configured to perform a task associated with a performance of an action that includes one or more pre-defined functions of an application and that utilizes a request-response based communication defined among the plurality of application nodes, wherein each application node comprises a component of one or more dependency pairings;
the one or more dependency pairings associated with the application nodes, wherein, to perform a first task, a first application node of a dependency pairing is dependent upon a performance of a second task by a second application node of the dependency pairing;
a hierarchy of the dependency pairings, wherein a higher level of the hierarchy includes the first application node of a dependency pairing, and a lower level of the hierarchy includes the second application node a dependency pairing; and
a controller configured to receive a request to perform the action and provide a response to the request based on the performance of the tasks associated with the action by the plurality of application nodes in the hierarchy.

17. The system of claim 16 wherein the first application node of a first dependency pairing is configured to request from the second application node of the first dependency pairing the response including the performance of the second task.

18. The system of claim 17 wherein the first application node is configured to perform the first task upon receipt of the response from the second application node including the performance of the second task.

19. The system of claim 16 wherein the second application node is configured to provide to the first application node of a first dependency pairing, a performance request including a request to perform the first task and a response including the performance of the second task by the second application node of the first dependency pairing.

20. A method comprising:
   determining a plurality of application nodes arranged as dependency pairings to perform an action that includes one or more pre-defined functions of an application and that utilizes request-response based communication defined among the plurality of application nodes, wherein each dependency pairing includes a first application node that is dependent upon a response by a second application node of the dependency pairing to perform a task associated with the action;
   determining a hierarchy of the dependency pairings including multiple levels, wherein a higher level of the hierarchy includes the first application node of a dependency pairing and a next lower level of the hierarchy includes the second application node of the dependency pairing;
   receiving a request to perform the action;
   providing the request to the second application node of a lowest level dependency pairing of the hierarchy;
   receiving a final response from the first application node of a highest level dependency pairing of the hierarchy, the final response including a performance of the tasks associated with the action by the application nodes; and
   providing the final response responsive to receiving the request.

21. A system comprising:
   at least one memory configured to store executable code; and
   at least one processor operably coupled to the at least one memory and configured to execute the code to cause the system to have:
   a graph of multiple application nodes that are arranged and configured to receive requests and produce responses, wherein each of the application nodes comprises a component of a dependency pairing including a first application node of the dependency pairing that is configured to request and receive from a second application node of the dependency pairing, a response to the request; and
   edges that are arranged and configured to provide interconnects between the application nodes in the graph and that determine a process and order of execution of requests incoming to the application nodes,
   wherein the application nodes are configured to:
      receive and process the incoming requests as determined by the edges by forwarding and processing data associated with the requests along the application nodes in the graph;
      generate responses from each of the application nodes having a request, by first processing requests and generating responses at maximal application nodes, wherein the responses of the maximal application nodes are provided as inputs to other connected application nodes to enrich the requests of the other connected application nodes and then by processing the requests and generating responses at the other connected application nodes; and
      based on the responses from each of the application nodes having the request, play a song on a digital music player.

* * * * *